United States Patent
Allio et al.

(10) Patent No.: US 12,386,195 B2
(45) Date of Patent: Aug. 12, 2025

(54) AUTOSTEREOSCOPIC SCREEN, DEEMED TO BE OF PHOTOGRAPHIC QUALITY

(71) Applicant: ALIOSCOPY, Paris (FR)

(72) Inventors: Pierre Allio, Paris (FR); Gilles Marcellier, Paris (FR); Flavien Maingreaud, Paris (FR)

(73) Assignee: ALIOSCOPY, Paris (FR)

( * ) Notice: Subject to any disclaimer, the term of this patent is extended or adjusted under 35 U.S.C. 154(b) by 40 days.

(21) Appl. No.: 18/401,351

(22) Filed: Dec. 30, 2023

(65) Prior Publication Data

US 2024/0219745 A1 Jul. 4, 2024

Related U.S. Application Data

(60) Provisional application No. 63/436,132, filed on Dec. 30, 2022.

(30) Foreign Application Priority Data

Dec. 29, 2022 (FR) ...................................... 2214631

(51) Int. Cl.
*G02B 30/29* (2020.01)
*H04N 13/305* (2018.01)
*H04N 13/324* (2018.01)

(52) U.S. Cl.
CPC ........... *G02B 30/29* (2020.01); *H04N 13/305* (2018.05); *H04N 13/324* (2018.05)

(58) Field of Classification Search
CPC .... G02B 30/29; H04N 13/305; H04N 13/324; H04N 13/317; H04N 13/351
USPC ............................................................. 348/51
See application file for complete search history.

(56) References Cited

U.S. PATENT DOCUMENTS

| | | | |
|---|---|---|---|
| 10,244,221 B2 * | 3/2019 | Lee .................... | G02B 30/27 |
| 2013/0208357 A1 * | 8/2013 | Saito .................. | G02B 30/27 359/463 |
| 2013/0265640 A1 * | 10/2013 | Saito ................ | H04N 13/317 359/463 |
| 2014/0029094 A1 * | 1/2014 | Kroon ................. | H04N 13/324 359/463 |
| 2022/0103796 A1 * | 3/2022 | Barenbrug .......... | H04N 13/305 |

* cited by examiner

*Primary Examiner* — Tung T Vo
(74) *Attorney, Agent, or Firm* — CRGO Global; Steven M. Greenberg

(57) ABSTRACT

A screen for autostereoscopic display includes a panel of pixels arranged by rows and by columns, each pixel being composed of a plurality of P active sub-pixels of different colors, and an ordered array of cylindrical lenses inclined with respect to the columns of the screen by an angle equal to arctan (1/12). The array has a pitch of N/2 pixels in width so as to be able to differentiate the even and odd lenses of the array by distinct distributions of the active zones and black zones of the pixels arranged under the lenses, and to decode each of the M×N viewpoints distributed within N vertical blocks 6 pixels in height from M viewpoints every 12 rows if the sub-pixels of the panel are horizontal, and distributed within P×N vertical blocks 6/P sub-pixels in height, from M/P viewpoints every 12/P rows if the sub-pixels of the panel are vertical.

9 Claims, 5 Drawing Sheets

[Fig. 1]
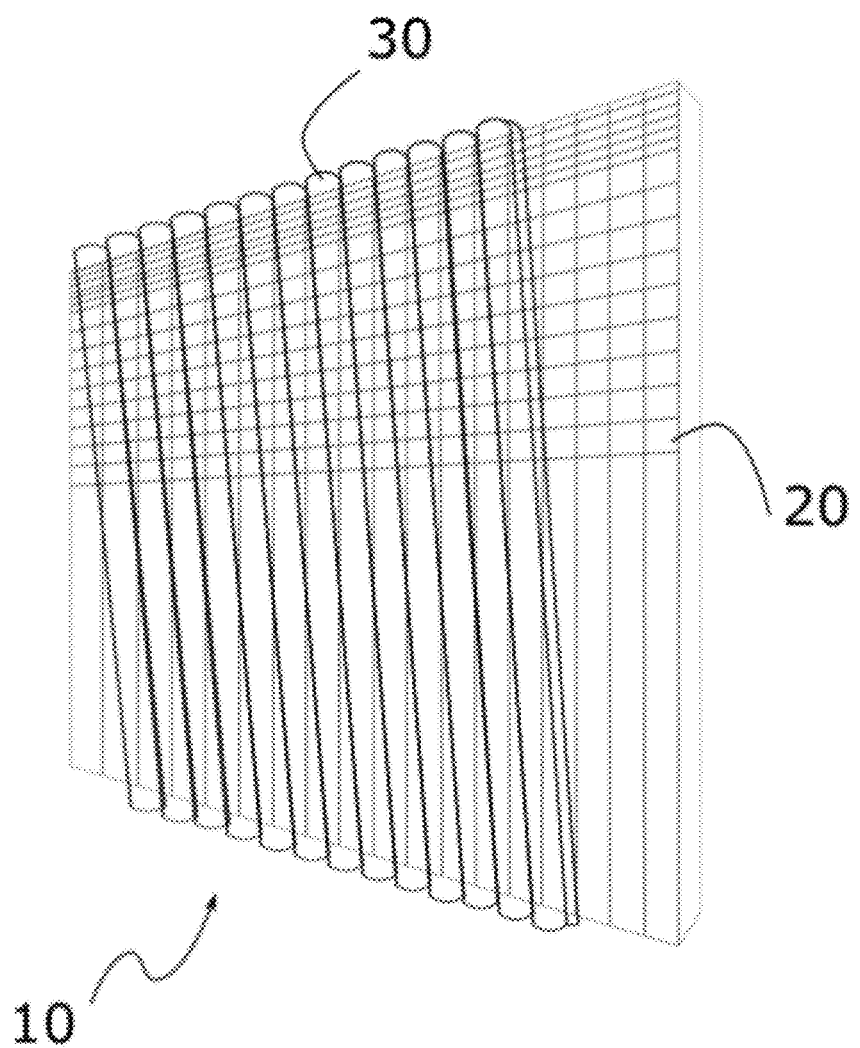

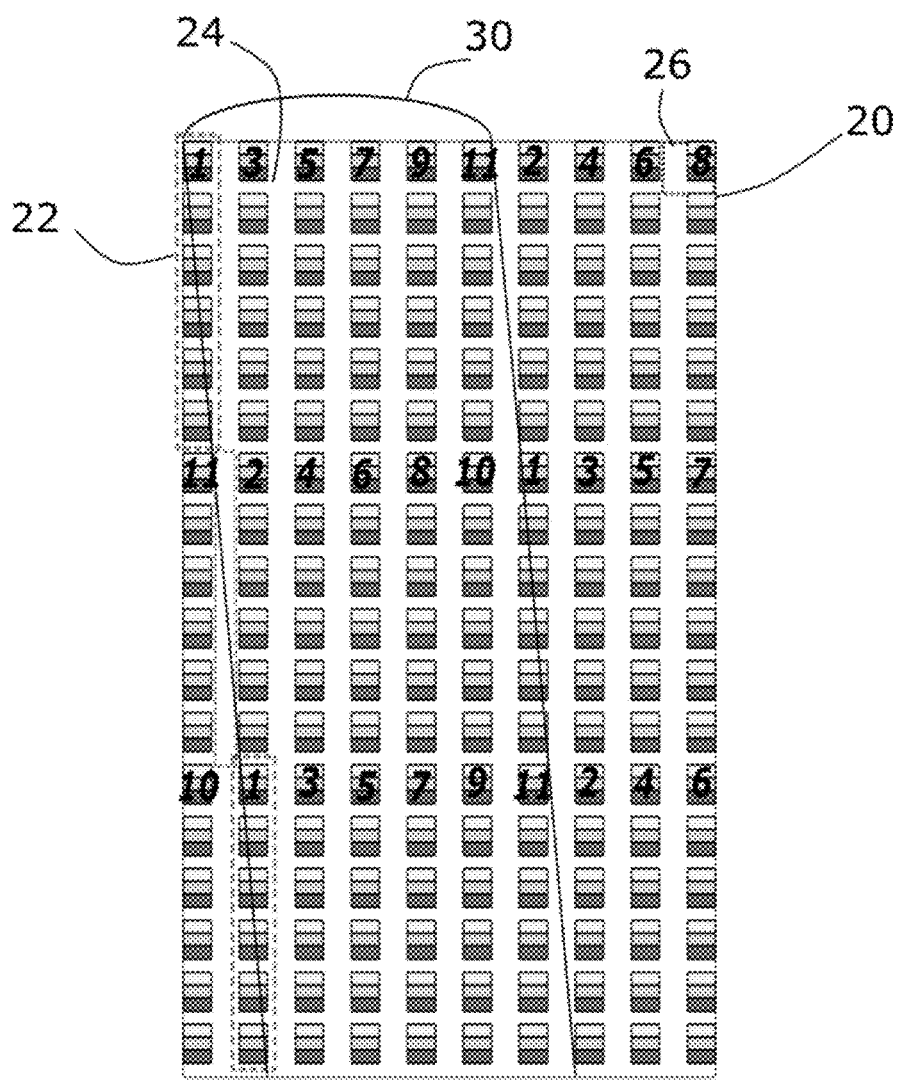
[Fig. 2]

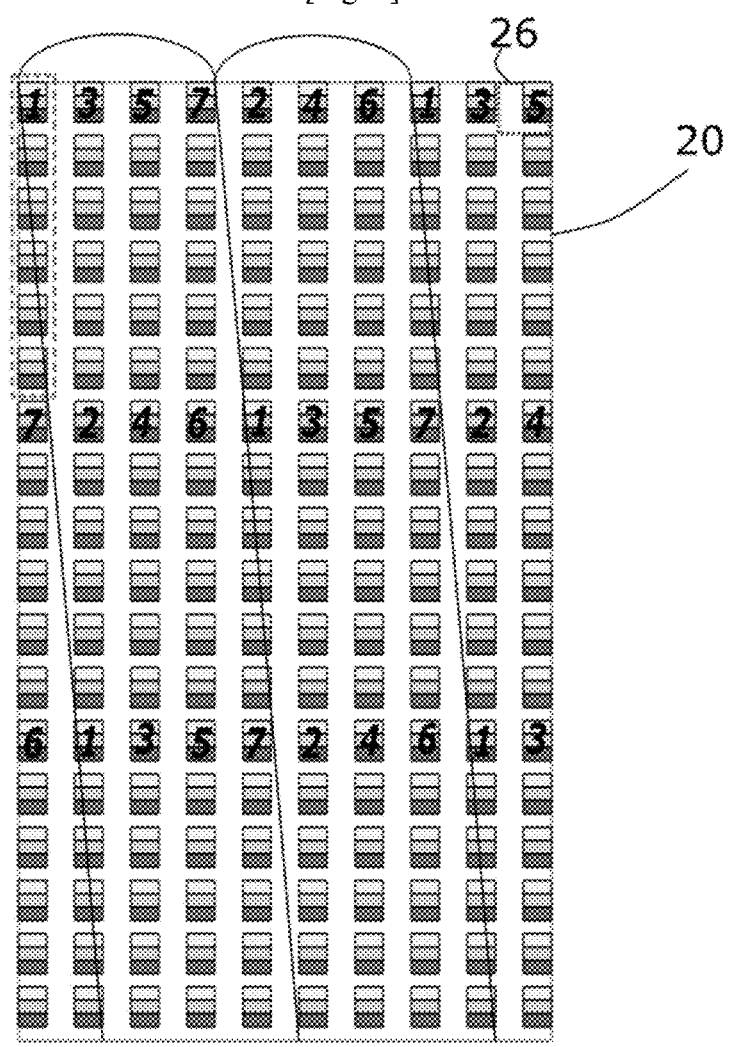
[Fig. 3]

[Fig. 4]
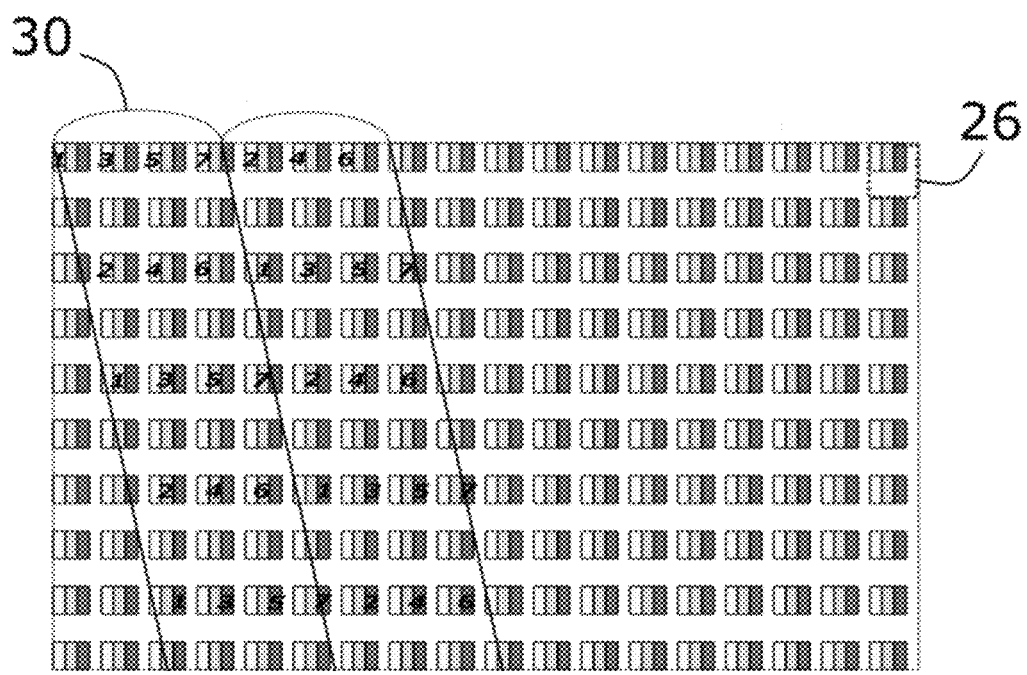

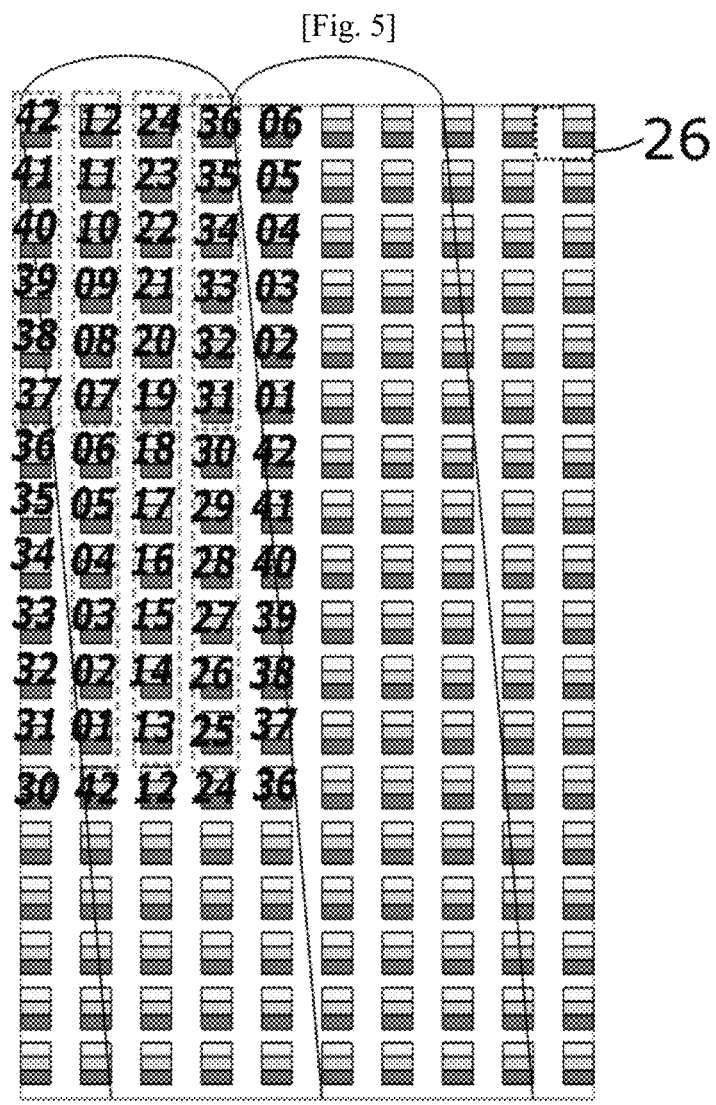
[Fig. 5]

AUTOSTEREOSCOPIC SCREEN, DEEMED TO BE OF PHOTOGRAPHIC QUALITY

CROSS REFERENCE TO RELATED APPLICATIONS

This application claims priority under 35 U.S.C. § 119(e) to U.S. Provisional Patent Application 63/436,132 filed on Dec. 30, 2022, the entire teachings of which are incorporated herein by reference.

BACKGROUND OF THE INVENTION

Field of the Invention

The invention relates to an autostereoscopic screen and a method for displaying an autostereoscopic image on such an autostereoscopic screen.

Description of the Related Art

Autostereoscopy is a technique enabling the three-dimensional display of images without requiring the wearing of special glasses by the viewer. This technique is known per se, in particular from the patents WO2006/024764, WO2014/041504, WO2013/140363, WO2014/016768, WO2019/063897, WO2019/207235, WO2022/175053 in the name of the applicant.

An autostereoscopic image is generally formed from a plurality of strips of interleaved elementary images, each corresponding to views of the same object or of the same scene from different viewpoints. A selecting device, typically formed by an array of cylindrical lenticules or a parallax barrier, is disposed in front of the display screen so as to enable the projection of a pair of elementary images corresponding to two different viewpoints of the scene, towards the two eyes of the viewer respectively, which creates an impression of three-dimensionality in the viewer's brain.

The applicant has already proposed an autostereoscopic screen for displaying an image with N viewpoints, including a matrix of pixels arranged by rows and by columns, each pixel being composed of a plurality of sub-pixels of different colors. Furthermore, the screen is surmounted by an array of identical cylindrical lenticules each having a focal distance configured to be able to reflect to infinity the light rays coming from the screen. The pitch of the array of cylindrical lenticules is precisely calculated so that, at a predetermined distance from the screen, the viewer sees the images in succession by virtue of a magnifying glass effect of the lenticule array.

This magnifying glass effect results from the fact that a lens placed at the correct distance (its focal distance) enlarges the sub-pixel(s) which is/are located in alignment with its optical axis and with the pupil of the eye of the viewer. If the lens enlarges N times, the sub-pixel(s) seen through the lens is/are perceived N times larger than it/they is/are in reality and masks for the eye which receives light therefrom through this lens the N−1 other sub-pixels which are not in the alignment described above.

Even the principle of the lenticular array does not make it possible to offer to the viewer a continuous parallax of the scene represented through an angle of 180°. The angle of observation is thereby subdivided into strips called "lobes", within which, on the one hand, the parallax is discretized. In each lobe it is possible to see the N viewpoints in succession. When one lobe is exited, the succession of the N identical viewpoints is found in the following lobe, and so on across the whole width of the observation zone of the screen. The angular width of the lobes is defined both by the pitch of the lenticular array and by its focal distance.

Autostereoscopic screens necessitate the sub-division of the lobes into discrete sub-parts which are perfectly clear to see, the individual width of which in the lobe cannot exceed the average interpupillary spacing, which is 6.5 cm.

Therefore, one of the keys to the performance of the autostereoscopic screens currently proposed by the applicant is control of the resolving power of the optical components which are developed specifically for each panel of pixels.

For printed autostereoscopic photographs (and not autostereoscopic screens) it is possible to inscribe a maximum of printing points or dots, contiguous but well differentiated from each other, on media offering good dimensional stability. By virtue of the printing techniques currently used, the applicant manages to print 100 points per millimeter and sometimes even more, which equates to seeing points of 10 microns or less.

When the viewer moves in front of such a photograph, he sees the different elements of the scene moving with respect to each other in a continuous manner and perfectly in accordance with the original physical volume as it would be perceived if it were seen at the same distance. The two eyes see two different viewpoints of the scene simultaneously, which enables the brain to recreate a perfectly natural feeling of three-dimensionality.

It is impossible, a priori, to find the quality of autostereoscopic photographs with screens insofar as these screens are formed from a matrix of pixels of greater or lesser resolution, composed of rows and columns aligned orthogonally and separated from each other by a black surround composed of opaque rows and columns of greater or lesser thickness according to the panels and which form a grid pattern around the active zones of the pixels. The surface ratio between the black surround and the colored active sub-pixels has an impact on the luminosity and the contrast of the screen but also on its autostereoscopic resolving power.

Throughout the text, the autostereoscopic screen is considered to have a photographic quality when it makes it possible to eliminate discrete jumps during passage from one stereoscopic pair to another, in the parts of the image where the disparity is greatest.

In other words, "photographic quality" is understood to mean a continuity in the three-dimensionality within the lobe, which seems, a priori, inaccessible to an autostereoscopic screen without equipping it with a tracking system.

The problems relating to moirage arise in addition to those relating to the resolving power. In fact, the lenticular array enlarges both the active zones of the panel of pixels and the black surround around them. This results in some sub-parts of the observation lobe being able to appear darker or lighter than others. These variations in luminosity are generally perceptible at the transition between two neighboring viewpoints. The moirage effect of light intensity varies according to the particular structure of the panel and the orientation of the screen.

BRIEF SUMMARY OF THE INVENTION

The inventors have sought to overcome the technical bias of the person skilled in the art, according to which it would be impossible, a priori, to find the quality of a photographic autostereoscopic image (characterized by continuity in the three-dimensionality within the lobe) with a screen having a panel of pixels.

The invention aims to provide an autostereoscopic screen deemed to be of photographic quality.

In particular, the invention aims to provide an autostereoscopic screen which makes it possible to obtain a continuum of the parallax without perceptible discretization of the viewpoints.

Thus the invention aims to provide, in at least one embodiment, a screen which offers a continuous parallax feeling in each lobe.

The invention also aims to provide an autostereoscopic screen without notable moirage or ghosting.

The invention also aims to provide a screen deemed to be of photographic quality irrespective of the structure of the sub-pixels of the panel of pixels of the screen (vertical or horizontal sub-pixels).

Finally, the invention aims to provide a method of displaying an autostereoscopic image on a screen in accordance with the invention.

In order to do this, the invention relates to an autostereoscopic display screen, deemed to be of photographic quality, for an autostereoscopic image with M×N viewpoints ordered from 1 to M×N, N being an odd integer strictly greater than 1 and M being an integer selected from 1, 2, 3 and 6.

The screen in accordance with the invention includes a panel of pixels arranged by rows and by columns, each pixel being composed of a plurality of P active sub-pixels of different colors and opaque inactive zones forming a portion of black inter-row areas and/or inter-column areas of the panel.

The screen in accordance with the invention is characterized in that it further includes an ordered array of cylindrical lenses mounted on the panel of pixels, each lens being inclined with respect to the columns of the screen by an angle equal to arctan (1/12).

Furthermore, the array has a pitch of N/2 pixels in width and makes it possible to differentiate the even and odd lenses of the ordered array by distinct distributions of the active zones of pixels and black zones of the panel arranged under each even and odd lens.

Furthermore, the array makes it possible to decode each of the M×N viewpoints distributed within N vertical blocks 6 pixels in height from M viewpoints (6/M pixels per viewpoint), with a periodic iteration of each block on the axis of a lens every 12 rows if the sub-pixels of the panel are horizontal, and distributed within P×N vertical blocks 6/P sub-pixels in height, from M/P viewpoints (6/M sub-pixels per viewpoint), with a periodic iteration of each block on the axis of a lens, every 12/P rows if the sub-pixels of the panel are vertical.

In other words, the screen has the feature of making it possible to encode on the panel extending under the lenses each of the M×N viewpoints with 6/M different vertical pixels within N vertical blocks 6 pixels in height which are repeated, under each lens, every 12 rows if the sub-pixels of the panel are horizontal, and with 6/M different vertical sub-pixels within P×N vertical blocks 6/P sub-pixels in height which are repeated, under each lens, every 12/P rows if the sub-pixels of the panel are vertical.

The array is configured to decode, by a magnifying glass effect, each of the M×N viewpoints encoded according to the principle set out above.

The screen in accordance with the invention also has the feature of being equipped with an array of cylindrical lenticules, each inclined with respect to the columns of the screen by an angle equal to arctan (1/12), i.e. by an angle of the order of 4.76-∞. The "arctan" function refers to the arctangent. The arctangent of a real number is the value of an oriented angle, the tangent of which equates to this number.

The screen also has the feature of having a lenticular array configured to make it possible to distribute, under each lens, the viewpoints over 12 consecutive rows if the sub-pixels are horizontal and 12/P consecutive rows if the sub-pixels are vertical.

Throughout the following, and in order to simplify the terminology, "horizontal mode" or "horizontal version" of the screen refers to the screen formed of horizontal sub-pixels and "vertical mode" or "vertical version" of the screen refers to the screen formed of vertical sub-pixels, it being understood that this does not indicate the portrait or landscape orientation of the screen. The horizontal mode and the vertical mode characterize only the orientation of the sub-pixels and not the portrait or landscape orientation of the screen.

Throughout the following and, unless stated to the contrary, in order to simplify terminology, "pixel" refers to the active zones of the pixel which make it possible to address the content and "black space" refers to the opaque inactive zones of the pixels which form the inter-row areas and/or inter-column areas of the screen.

In horizontal mode, with an inclination of 4.76-∞, each lens of the lenticular array traverses a group of elementary vertical blocks of 6 pixels, then a black space, before meeting a new group of elementary blocks of 6 pixels. It should be noted that all the matrices of pixels have a black opaque zone between each row of active pixels but this row, a constituent part of the pixel, makes it possible, according to its percentage in the pixel, to benefit from a good resolving power.

Since N is an odd integer, the ordered array of the screen has a non-integer pitch N/2, which makes it possible to differentiate the even lenses and the odd lenses by at least partially therein setting the distribution of the light zones (active zones of the pixels) against the distribution of the black zones (opaque zones of the pixels) of the screen. In other words, if the lenses of the ordered array are numbered, from the left of the screen to the right of the screen, the panel of pixels under the even lenses has the same distribution of the zones of active pixels and of the black zones of the screen, and the panel of pixels under the odd lenses of the screen has the same distribution of the zones of active pixels and of the black zones of the screen, the distribution of the even lenses being distinct from the distribution of the odd lenses of the screen. If the portion of the panel of pixels under an even lens were superimposed with the portion of the panel of pixels under an odd lens, it would thus be noted that at least a part of the dark zones of the panel under the even lens is facing at least a part of the active zones of the panel under the odd lens and at least a portion of the active zones of the panel under the even lens is facing at least a portion of the dark zones of the panel under the odd lens.

For an array of 11×M viewpoints (N is equal to 11), the lenses have a pitch of 5.5 pixels in width (in the non-simplified definition of the pixel). For an array of 7×M viewpoints (N is equal to 7), the lenses have a pitch of 3.5 pixels in width.

The array of the screen in accordance with the invention makes it possible to decode by a magnifying glass effect each of the M×N viewpoints distributed within N vertical blocks 6 pixels in height from M viewpoints (6/M pixels per viewpoint), with a periodic iteration of each block on the axis of a lens every 12 rows if the sub-pixels of the panel are horizontal, and distributed within P×N vertical blocks 6/P sub-pixels in height, from M/P viewpoints (6/M sub-pixels per viewpoint), with a periodic iteration of each block on the axis of a lens, every 12/P rows if the sub-pixels of the panel are vertical.

In the horizontal version, the advantage of having vertical blocks (also referred to by the terminology of elementary blocks) of 6 pixels is that of offering the alternative of allocating the same viewpoint or even different viewpoints to each of these pixels.

When the scene represented is shallow, this poses little problem in displaying the same viewpoint, referred to as principal viewpoint, over the 6 consecutive pixels of an elementary block.

On the other hand, the perceived quality deteriorates when the disparity is greater. The perfect focusing of the arrays then brings about a clear perception of the discretization of the content at great depth or strongly protruding content and this impairs the photographic experience (continuous parallax) being targeted. When the horizontal translation of a contrasted detail in the image exceeds 2 or 3 lenses during a change in viewpoint, the discretization is excessive and it thus becomes indispensable to increase the number of viewpoints. Although this is effected to the detriment of the initial resolution of the principal viewpoints displayed, the improvement in the perceived quality is obvious.

If a slightly different viewpoint is allocated to each of the 6 pixels of each elementary block, the discretization disappears in the scenes with strong disparity.

The screen in accordance with the invention thus makes it possible to display viewpoints, referred to as intermediate viewpoints, between the N principal viewpoints of the image to be displayed. These intermediate viewpoints are slightly shifted between each principal viewpoint in order to distribute them within each elementary block. The continuum between the successive principal viewpoints creates an effect of depth of photographic field in the far backgrounds and the strongly protruding foregrounds instead of an ostensible discretization.

In other words, the screen in accordance with the invention is remarkable in that it makes it possible to use groups 6 pixels in height per principal pixel (of which it forms part) in order to encode slightly different viewpoints in order to fill by a continuum the discrete succession of the principal viewpoints in order to come close to the quality of the autostereoscopic photographic images.

By virtue of this novel approach, which we refer to throughout the text as "tiling effect", the objective being targeted of finding on a screen the continuity of the parallax of printed photographic images is achieved.

In particular, in a three-dimensional image, the disparity between viewpoints is accentuated as one moves away from the plane of the screen (also referred to as collimation plane). The overlap between common viewpoints, referred to as "crosstalk", is identical over the whole screen and it affects the whole of the displayed image but is only revealed in the parts of the image where the disparity between viewpoints is great.

In particular, the inventors have realized that photographic blurring is potentially information associated with three-dimensionality, but also the materialization of the depth of field. The inventors have thus sought, contrary to the bias in the technical field, to cause the depth or protrusion in an image to materialize by progressive fade and not by discretization between viewpoints. The overall impression being targeted is that of a deep and continuous image, in which the fade between viewpoints is accentuated as the objects move away from the collimation plane, assimilated as the focusing plane.

The discretization between viewpoints thus materializes when identifiable details in the image are repeated a number of times. When the disparity in a scene is great and the number of viewpoints insufficient to distribute it harmoniously between each, it is often the case that contrasted objects far from the collimation plane are degraded by the perception of ghosting.

To the contrary, the deep details of a number of viewpoints can overlap simultaneously, with attenuation of the intensity and of the contrast in the redundancy perceived as one moves away from the central viewpoint, thus, a single object is reformed visually even if its image remains a little blurred.

The screen in accordance with the invention offers the possibility of adapting the number of viewpoints displayed (by modifying the value of M) according to the disparity in the image, both in depth and protrusion, with the ghosting of the details at the limits of the volume being the determining factor. This novel screen offers the viewer a continuous parallax within the lobe, without apparent discretization but with, instead, progressive fading of the details as the limits of the volume are reached.

This approach runs contrary to the screens proposed thus far, in which the aim was to seek perfect discretization of the viewpoints and this was considered to be the path to follow in order to provide a high-quality screen.

Advantageously and in accordance with the invention, each pixel of the panel of pixels is composed of a plurality of P horizontal sub-pixels of different colors juxtaposed on each other in the direction of the columns, so as to be able to encode each of the M×N viewpoints with 6/M different vertical pixels, which are repeated, under each lens, every 12 rows, M being equal to 1, 2, 3 or 6.

In other words, the screen in accordance with the invention makes it possible, in the horizontal version, to display as desired:
N principal viewpoints, each encoded with 6 different contiguous vertical pixels (M being equal to 1 in this case),
2×N viewpoints each encoded with 3 different vertical pixels (M being equal to 2 in this case),
3×N viewpoints each encoded with 2 distinct vertical pixels (M being equal to 3 in this case),
6×N viewpoints each encoded with a single pixel (M being equal to 6 in this case).

Advantageously and in accordance with the invention, each pixel of the panel of pixels is composed of a plurality of P vertical sub-pixels of different colors juxtaposed one beside another in the direction of the rows, so as to be able to encode each of the M×N viewpoints with 6/M different vertical sub-pixels, which are repeated, under each lens, every 12/P rows, M being equal to 3 or 6.

In other words, the screen in accordance with the invention makes it possible, in the vertical version, to display as desired:
3×N viewpoints each encoded with 2 distinct vertical sub-pixels (M being equal to 3 in this case),
6×N viewpoints each encoded with a single sub-pixel (M being equal to 6 in this case).

Furthermore, the screen in accordance with the invention has narrower lobes than the screens previously proposed by the applicant. In order to do this, the optical components have relatively long focal distances in order to tighten up the lobe as much as possible without reducing the convenience with which the viewer positions himself. This makes it possible to increase the resolving power and angular continuity. Narrower lobes multiply the transition zones but they also divide the observation space in front of the screen into narrower strips, where a number of viewers can be positioned simultaneously and very comfortably, at different distances.

The invention thus runs contrary to a bias of the person skilled in the art who considers that a greater lobe width is indissociable from the quality of an autostereoscopic screen. Contrary to what might be assumed, the perceived image quality when the 6 pixels of an elementary block belong to the same high-resolution viewpoint is comparable to that which is obtained when, in this elementary block, intermediate viewpoints of lower resolution are "tiled" instead of the principal viewpoint being spread. In other words, a display with very high theoretical resolving power does not prove to be better than a display having partial overlap of intermediate viewpoints by a "tiling" effect. On the other hand, instead of the deep details discretizing when the resolving power is optimized, they spread out in the manner of a depth of field effect into a blur of circular appearance. The intermediate viewpoints spread horizontally and vertically at the same time, which makes possible this quasi-isotropic improvement in the resulting image.

Humans are used to depth of field blurring and it is physiologically inevitable to perceive blurring in the most remote planes of a three-dimensional image. The brain easily accepts that the blurring results from the distance of these planes and this does not adversely affect the feeling of general clarity which we otherwise perceive in the image.

According to one variant of the invention, the screen has the feature of being provided with a panel of pixels which, when it is oriented in horizontal mode (or vertical mode respectively), has columns (or rows respectively) each separated each other by black inter-column areas (or black inter-row areas respectively), the width (or height respectively) of which is close to that of the active zones of the pixels of the panel. These black surfaces form a black surround, the surface of which is close to the active surface of the screen. This makes it possible to have excellent levels of contrast.

Furthermore, according to this variant and in the case of the horizontal sub-pixels, the active and dark zones of the portions of the panel which are arranged under the even and odd lenses are opposite to each other. In other words, the active zones under the even lenses correspond to the dark zones under the odd lenses and the dark zones under the even lenses correspond to the active zones under the odd lenses.

Advantageously and in accordance with the invention, N is equal to 7 or 11.

The inventors have determined that finer lenticular arrays, which make it possible to display only 7 or 11 principal viewpoints, make it possible to further marginalize the structure effect. This being the case, there is naturally nothing to prevent the use of a different number of viewpoints.

Advantageously and in accordance with the invention, P is equal to 3.

According to this variant, each pixel of the matrix of pixels is composed, when the screen is oriented in the horizontal mode, of three horizontal sub-pixels of different colors juxtaposed on each other in the direction of the columns and the columns are separated from each other by a black inter-column space. Of course, when this screen is oriented in a vertical mode, each pixel of the matrix is composed of three vertical sub-pixels of different colors juxtaposed one beside the other in the direction of the rows, and the rows are separated from each other by a black inter-row space.

Nevertheless, there is nothing to prevent the use of panels of pixels where each pixel is formed of four sub-pixels. In particular, there are panels in which a white sub-pixel is added to the three usual colors, red, green and blue.

Advantageously and in accordance with the invention, the matrix of pixels is an 8K panel of pixels.

Such a panel of pixels makes it possible to use the highest resolutions currently available. Such a panel is, for example, a panel of 31.5" resolution 7680×4320 pixels, which, oriented in portrait mode, has a matrix of pixels each formed of horizontal RGB stripes.

In fact, the higher the resolution of the screen, the greater the possibility of displaying a large number of viewpoints thereon simultaneously. It is thus possible either to use these additional viewpoints to enlarge the lobe by reducing the focal distance at constant pitch, or to reduce the width occupied by each viewpoint in the lobe by dedicating a sub-part of the narrower lobe thereto in order to come closer to a photographic effect.

The invention also relates to a method for autostereoscopic display of photographic quality of an autostereoscopic image with M×N viewpoints ordered from 1 to M×N, N being an odd integer strictly greater than 1 and M being an integer selected from 1, 2, 3 and 6, characterized in that it includes:

the selection of an autostereoscopic display screen in accordance with the invention, the distribution under each lens of the M×N viewpoints distributed within N vertical blocks 6 pixels in height from M viewpoints (6/M pixels per viewpoint), with a periodic iteration of each block on the axis of a lens every 12 rows if the sub-pixels of the panel are horizontal, and distributed within P×N vertical blocks 6/P sub-pixels in height, from M/P viewpoints (6/M sub-pixels per viewpoint), with a periodic iteration of each block on the axis of a lens, every 12/P rows if the sub-pixels of the panel are vertical.

In other words, the method for autostereoscopic display in accordance with the invention makes possible the distribution under each lens of the M×N viewpoints of the image within N elementary blocks which are repeated every 12 consecutive rows if the pixels of the screen are formed of horizontal sub-pixels or within N×P elementary blocks which are repeated every 12/P consecutive rows if the pixels of the screen are formed of vertical sub-pixels.

The advantages and technical effects of the screen in accordance with the invention apply mutatis mutandis to a display method in accordance with the invention.

Advantageously and in accordance with the invention, each of the M×N viewpoints of the image are encoded, for a panel formed of horizontal sub-pixels, with 6/M different vertical pixels within the N elementary blocks 6 pixels in height, M being equal to 1, 2, 3 or 6.

Advantageously and in accordance with the invention, each of the M×N viewpoints of the image are encoded, for a panel formed of vertical sub-pixels, with 6/M different vertical sub-pixels within the P×N elementary blocks 6/P sub-pixels in height, M being equal to 3 or 6.

When the screen in accordance with the invention is oriented in vertical sub-pixel mode, the pixels are located in a configuration in which the sub-pixels extend vertically and are P times taller than wide. In the case where each pixel is formed of three RGB sub-pixels (P being equal to 3 in this case), each square pixel is formed of three vertical sub-pixels juxtaposed horizontally.

The addressing of the content is no longer effected at the pixel as for the screen according to the horizontal variant but at the sub-pixel. The distribution of the viewpoints (also referred to by the term "mix") can thus be effected over a group of 4 consecutive rows (12/3) instead of 12. With an equivalent number of viewpoints, the viewpoints are thus spread horizontally in proportions three times greater than the mix of the horizontal version.

Each viewpoint is encoded over at least two rows, which in this case additionally offers the possibility either of using fewer higher-resolution viewpoints or of "tiling" intermediate viewpoints depending on the depth of the three-dimensionality in the scene.

In the vertical sub-pixel version, the sub-pixel of the same viewpoint under the adjacent lens is located 4 rows lower down and on the following color. In the case where N is equal to 11, two encoding possibilities are thus obtained: 33 encoded viewpoints each with 2 different vertical sub-pixels (M being equal to 3 in this case) or 66 viewpoints each encoded with a single sub-pixel (M being equal to 6 in this case).

Irrespective of the version of the screen (horizontal or vertical), the method in accordance with the invention makes it possible to adapt the number of viewpoints displayed according to the disparity in the image, in depth and in protrusion, with the ghosting of the details at the limits of the volume being the determining factor.

It is possible either to use fewer higher-resolution viewpoints or to "tile" intermediate viewpoints depending on the depth of the three-dimensionality in the scene.

The invention also relates to a display screen and a display method, which are characterized in combination by all or some of the features mentioned above or below.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a schematic view of a display screen in accordance with one embodiment of the invention, FIG. 2 is a schematic view of a display screen in accordance with one embodiment of the invention with eleven principal viewpoints, FIG. 3 is a schematic view of a display screen in accordance with another embodiment of the invention with seven principal viewpoints and oriented in portrait mode, FIG. 4 is a schematic view of a display screen in accordance with another embodiment of the invention with seven principal viewpoints and oriented in landscape mode, FIG. 5 is a schematic view of a display screen in accordance with another embodiment of the invention with forty-two viewpoints and oriented in portrait mode.

DETAILED DESCRIPTION OF THE INVENTION

In the figures, for the purposes of illustration and clarity, scales and proportions have not been strictly respected.

FIG. 1 schematically illustrates a screen 10 for displaying an autostereoscopic image with 6×N viewpoints including a matrix of pixels 20 arranged by rows and by columns. In other words, in the described embodiment, M is equal to 6.

The matrix of pixels is surmounted by an array of cylindrical lenses 30 (also referred to by the terminology of "lenticular array") each inclined with respect to the columns by an angle equal to arctan (1/12), i.e. an angle of 4.76°. In FIG. 1, the illustrated inclination is accentuated only for the purposes of illustration.

This array of cylindrical lenses 30 has a pitch of N/2 pixels in width, so that each lens of the array extends over a vertical block of six active zones of pixels of one column of the screen, referred to as elementary block, then a black inter-column space and a new elementary block of six active zones of pixels of the following column, and so on to the bottom of the screen.

As indicated above, each pixel is composed of a plurality of 3 active sub-pixels (P is equal to 3) of different colors and of opaque inactive zones forming a portion of black inter-row areas and/or inter-column areas of the panel. This being the case, (and for the sake of simplification) the term "pixel" refers to the active zones of the pixel which make it possible to address the content, and the term "black space" refers to the opaque inactive zones of the pixels which form the inter-row areas and/or inter-column areas of the screen.

The reference numeral 26 indicates a pixel in terms of the invention, in its non-simplified version, i.e. the group formed by the active zone of the pixel and the black zone which surrounds this active pixel zone.

The lenticular array is, for example, an array produced according to the method described in the application WO2020/178506 in the name of the applicant.

FIG. 2 schematically illustrates a portion of a panel of pixels of a screen in accordance with one embodiment of the invention including horizontal sub-pixels and on which a lens 30 of the lenticular array is illustrated. This screen is designed to display an image with eleven principal viewpoints (i.e. N is equal to 11).

In order to do this, the panel of pixels (or matrix of pixels) includes a plurality of pixels 26 arranged by rows and by columns. Each pixel 26 is formed of three horizontal sub-pixels of different colors and corresponding to the components R, G, B.

The columns of pixels are separated from each other by a black inter-column space 24 of a width substantially equal to the width of an active zone of the pixel 26 of the screen. In FIG. 2, these black columns are shown in white for the sake of clarity.

Each lens 30 of the array of cylindrical lenses is inclined with respect to the columns of the screen by an angle equal to arctan (1/12), i.e. 4.76°.

The array is designed so that its pitch is 5.5 pixels in width (11/2). Each lens of the array 30 extends over a group of vertical blocks 22 of six pixels of one column of the screen, referred to as an elementary block 22, then a group of black inter-column spaces of equivalent height and a new group of elementary blocks of six pixels of the following column, and so on to the bottom of the screen.

Such a screen makes it possible to display 11×M viewpoints, M being an integer which may have a value of 1, 2, 3 or 6.

FIG. 2 shows the eleven principal viewpoints using Roman numerals in italics. Thus, for the elementary block referenced 22, the principal viewpoint of this block is the viewpoint 1. The following elementary block of the same column encodes the viewpoint 11.

It will be noted that under the illustrated lens 30, the first row of elementary blocks encodes the odd viewpoints (1, 3, 5, 7, 9 and 11) and the $2^{nd}$ row of elementary blocks encodes the even viewpoints (2, 4, 6, 8 and 10).

The eleven principal viewpoints are thus interlaced, under the lens, over twelve consecutive rows in the horizontal version. If the screen is designed in vertical mode, the eleven viewpoints are thus interlaced over four consecutive rows (insofar as it is then possible to address the sub-pixels and not the whole pixels).

As can be seen in FIG. 2, in order to find the same viewpoint under the illustrated lens it is necessary to shift by one column to the right and twelve rows downwards. It will thus be well understood that if the viewer sees the viewpoint/ with one eye and if he shifts slightly to the left (the movement of the viewer is the inverse of the horizontal shift of the viewpoints addressed to the eye owing to the presence of the lens), he will then see the viewpoint 2, then the viewpoint 3, and so on to viewpoint 11. These eleven viewpoints are interlaced over twelve rows of the panel of pixels.

For each elementary block, intermediate viewpoints between the principal viewpoint of the block and the principal viewpoint of the following block can also be assigned to the other pixels of this elementary block (in other words, it is possible to display an image with 11×M viewpoints, with M selected from among 1, 2, 3 and 6).

The optical axis of the lenticular array 30 cuts the traversed pixels at an angle of 4.76°. This makes it possible to successively align each of the six traversed pixels of an elementary block with sub-parts of the solid angle occupied by each principal viewpoint.

Since a pixel is formed of three sub-pixels, each elementary block 22 of six pixels is thus formed of eighteen stacked horizontal sub-pixels. The traversing of an elementary block of six pixels is thus in reality the progressive traversing of these eighteen sub-pixels.

When a distinct viewpoint is assigned to each of the six pixels of an elementary block 22, eighteen cases of partial covering thus in fact occur.

The traversed sub-pixels must thus be assimilated with theoretical points located at the barycenter of the surface in question.

When the six pixels of an elementary block are allocated to six different viewpoints, the overlaps are obvious and mixing inevitable. However, the perceived quality is higher than that obtained with principal viewpoints of better resolution.

The screen in accordance with the embodiment of FIG. 2 thus makes it possible, as desired, to exploit contents with 11, 22, 33 or 66 viewpoints:

11 principal viewpoints, each encoded with six different contiguous vertical pixels (M is equal to 1), 22 viewpoints each encoded with three different vertical pixels (M is equal to 2), 33 viewpoints each encoded with two different vertical pixels (M is equal to 3), 66 viewpoints each encoded with a single pixel (M is equal to 6).

FIG. 3 schematically illustrates a portion of a panel of pixels of a screen in accordance with another embodiment of the invention, oriented in horizontal sub-pixel mode and intended to display seven principal viewpoints (N is equal to 7).

The difference with respect to the screen of FIG. 2 is the lenticular array which has a pitch of 3.5 pixels instead of 5.5 pixels.

Each lens of the array 30 of cylindrical lenses is also inclined, each with respect to the columns of the screen by an angle equal to arctan (1/12), i.e. 4.76°.

The seven principal viewpoints are distributed under each lens over twelve consecutive rows, according to the same principle as that explained in relation to FIG. 2.

FIG. 3 shows the different distributions of the active zones and of the opaque zones under the first two lenses, representative of the odd lenses and of the even lenses. In particular, the portion of the panel of pixels under the viewpoint 1 of the first lens corresponds to an opaque zone under the second lens, and the adjacent opaque portion of the viewpoint 1 under the first lens corresponds to the viewpoint 2 under the second lens.

It will be clearly observed that if the portion of the panel of pixels under the first lens (characteristic of an odd lens) were superimposed with the portion of the panel of pixels under the second lens (characteristic of an even lens), the active zones of the even lens correspond to the opaque zones of the odd lens and the opaque zones of the even lens correspond to the active zones of the odd lens.

FIG. 5 illustrates the same screen as that of FIG. 3 with the sole difference that each pixel of the screen has been assigned a distinct image viewpoint. Thus, the screen makes it possible to display an image with 42 viewpoints (N is equal to 7 and M is equal to 6).

It will be noted that in the first elementary block of the first column illustrated, the viewpoints 42, 41, 40, 39, 38 and 37 are assigned to the six pixels of the elementary block. In the adjacent elementary block of the second column, the viewpoints 12, 11, 10, 09, 08 and 07 are assigned to the six pixels of the elementary block. In the following elementary block of the third column, the viewpoints 24, 23, 22, 21, 20 and 19 are assigned to the six pixels of the elementary block, and so on for the 7 elementary blocks arranged under the first lens over the first 12 rows of the panel of pixels. The 7 elementary blocks are illustrated schematically by rectangles of dashed lines each surrounding six consecutive pixels in the direction of the columns.

In other words, for each of the 7 elementary blocks, one of the 42 viewpoints has been assigned to one of the pixels of the elementary block and one of the 5 following viewpoints in the series of the 42 viewpoints has been assigned to the other pixels of this elementary block. For the first elementary block of the first column, the viewpoint 37 can be considered to be the principal viewpoint and the viewpoints 38, 39, 40, 41 and 42 can be considered to be the intermediate viewpoints formed by the following viewpoints in the series of 42 viewpoints.

Under the first lens illustrated, the first twelve rows of the screen thus make it possible to display the 42 viewpoints of the image. It will be noted that the viewpoint 42 is located under the first lens, in the second column and in the $13^{th}$ row. The viewpoint 12 of the first row and of the second column is located on the third column in the $13^{th}$ row, and so on for each of the viewpoints. The same pattern is repeated for each lens and over the whole screen (not shown in the figure for the sake of clarity).

FIG. 4 illustrates a screen designed to display a maximum of 42 viewpoints, but with an orientation with vertical sub-pixels. This screen thus also presents a lenticular array inclined with respect to the columns of the screen by an angle corresponding to 4.76°. The seven principal viewpoints are distributed, under the lenses, over four consecutive rows (instead of 12 for the horizontal sub-pixel version) insofar as it is thus possible to address the sub-pixels and not the whole pixels.

Thus, it will be noted that the viewpoint 1 is encoded by the white sub-pixel of the first pixel at the top left of the figure. The viewpoint 1 is found in the $5^{th}$ row and $2^{nd}$ column of the screen, under this same lens, encoded by the light grey sub-pixel of the pixel and in the $9^{th}$ row and $3^{rd}$ column of the screen, encoded by the black sub-pixel of the pixel. The same applies for all the seven viewpoints of the image.

Following the example of the screen in horizontal sub-pixel mode, it is possible either to use fewer higher-resolution viewpoints, or to "tile" intermediate viewpoints depending on the depth of the three-dimensionality in the scene.

Irrespective of the embodiment, the lenticular array has an angle which makes it possible to distribute each viewpoint both vertically and horizontally. These viewpoints are the to be "principal" when the same viewpoint can occupy only the group of pixels of a vertical elementary block and they are the to be "intermediate" when a plurality of slightly shifted viewpoints are "tiled" in this same block and complete the principal viewpoint. The intermediate viewpoints can be considered as filler viewpoints which fill in the discrete parallax jumps between principal viewpoints so as to offer the viewer a continuous parallax feeling. They serve to smooth out the parallax jumps which may be perceptible between principal viewpoints.

The invention has been described with a fixed M within the image. In other words, the number of viewpoints is determined uniformly depending on the targeted disparity in the image. This being the case, it is possible to use the screen with a dynamic variation of the number of viewpoints (and thus of the integer M) within the same image depending on the disparity. For example, it is possible to make provision for M to be fixed at 1 or 2 for a low level of three-dimensionality and for M to be fixed at 3 or 6 for greater three-dimensionality. This makes it possible to limit only highly three-dimensional zones of an image, the need to generate 3D information with a large number of different viewpoints. Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A screen for autostereoscopic display, deemed to be of photographic quality, of an autostereoscopic image with M×N viewpoints ordered from 1 to M×N, N being an odd integer strictly greater than 1, and M being an integer selected from 1, 2, 3 and 6, said screen comprising:
a panel of pixels arranged by rows and by columns, each pixel being composed of a plurality of P active sub-pixels of different colors and of opaque inactive zones forming a portion of black inter-row areas and/or inter-column areas of said panel,
an ordered array of cylindrical lenses mounted on said panel of pixels, each lens being inclined with respect to the columns of the screen by an angle equal to arctan (1/12), said array having a pitch of N/2 pixels in width so as to be able to both differentiate the even and odd lenses of said ordered array by distinct distributions of the active zones of pixels and of the black zones of the panel arranged under each even and odd lens, and also to decode each of the M×N viewpoints distributed within N vertical blocks 6 pixels in height from M viewpoints (6/M pixels per viewpoint), with a periodic iteration of each block on the axis of a lens every 12 rows if the sub-pixels of the panel are horizontal, and distributed within P×N vertical blocks 6/P sub-pixels in height, from M/P viewpoints (6/M sub-pixels per viewpoint), with a periodic iteration of each block on the axis of a lens, every 12/P rows if the sub-pixels of the panel are vertical.

2. The autostereoscopic display screen of claim 1, wherein each pixel of said panel of pixels is composed of a plurality of P horizontal sub-pixels of different colors juxtaposed on each other in the direction of the columns, so as to be able to encode each of the M×N viewpoints with 6/M different vertical pixels, which are repeated, under each lens, every 12 rows, M being equal to 1, 2, 3 or 6.

3. The autostereoscopic display screen of claim 1, wherein each pixel of said panel of pixels is composed of a plurality of P vertical sub-pixels of different colors juxtaposed one beside another in the direction of the rows so as to be able to encode each of the M×N viewpoints with 6/M different vertical sub-pixels, which are repeated, under each lens, every 12/P rows, M being equal to 3 or 6.

4. The autostereoscopic display screen of claim 1, wherein N is equal to 11.

5. The autostereoscopic display screen of claim 1, wherein P is equal to 3.

6. The autostereoscopic display screen of claim 1, wherein said panel of pixels (20) is an 8K panel of pixels.

7. A method of autostereoscopic display of photographic quality of an autostereoscopic image with M×N viewpoints ordered from 1 to M×N, N being an odd integer strictly greater than 1 and M being an integer selected from 1, 2, 3 and 6, the method comprising:

selecting an autostereoscopic display screen comprising:

a panel of pixels arranged by rows and by columns, each pixel being composed of a plurality of P active sub-pixels of different colors and of opaque inactive zones forming a portion of black inter-row areas and/or inter-column areas of said panel, an ordered array of cylindrical lenses mounted on said panel of pixels, each lens being inclined with respect to the columns of the screen by an angle equal to arctan (1/12), said array having a pitch of N/2 pixels in width so as to be able to both differentiate the even and odd lenses of said ordered array by distinct distributions of the active zones of pixels and of the black zones of the panel arranged under each even and odd lens, and also to decode each of the M×N viewpoints distributed within N vertical blocks 6 pixels in height from M viewpoints (6/M pixels per viewpoint), with a periodic iteration of each block on the axis of a lens every 12 rows if the sub-pixels of the panel are horizontal, and distributed within P×N vertical blocks 6/P sub-pixels in height, from M/P viewpoints (6/M sub-pixels per viewpoint), with a periodic iteration of each block on the axis of a lens, every 12/P rows if the sub-pixels of the panel are vertical, distributing under each lens of the M×N viewpoints distributed within N vertical blocks 6 pixels in height from M viewpoints (6/M pixels per viewpoint), with a periodic iteration of each block on the axis of a lens every 12 rows if the sub-pixels of the panel are horizontal, and distributed within P×N vertical blocks 6/P sub-pixels in height, from M/P viewpoints (6/M sub-pixels per viewpoint), with a periodic iteration of each block on the axis of a lens, every 12/P rows if the sub-pixels of the panel are vertical.

8. The method of claim 7, wherein each of the M×N viewpoints of the image are encoded, for a panel formed of horizontal sub-pixels, with 6/M different vertical pixels within the N elementary blocks 6 pixels in height, M being equal to 1, 2, 3 or 6.

9. The method of claim 7, wherein each of the M×N viewpoints of the image are encoded, for a panel formed of vertical sub-pixels, with 6/M different vertical sub-pixels within P×N elementary blocks 6/P sub-pixels in height, M being equal to 3 or 6.

* * * * *